United States Patent
Johnson et al.

(10) Patent No.: US 7,840,554 B2
(45) Date of Patent: Nov. 23, 2010

(54) METHOD FOR EVALUATING A CONJUNCTION OF EQUITY AND RANGE PREDICATES USING A CONSTANT NUMBER OF OPERATIONS

(75) Inventors: F Ryan Johnson, Pittsburgh, PA (US); Vijayshankar Raman, Sunnyvale, CA (US); Garret Frederick Swart, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/056,999

(22) Filed: Mar. 27, 2008

(65) Prior Publication Data
US 2009/0248648 A1   Oct. 1, 2009

(51) Int. Cl.
G06F 7/00 (2006.01)
(52) U.S. Cl. .............. 707/714; 707/719; 707/757; 706/47; 716/4
(58) Field of Classification Search .......... 707/999.002, 707/999.004, 714, 719, 757; 706/47; 716/4
See application file for complete search history.

(56) References Cited

U.S. PATENT DOCUMENTS

| | | | |
|---|---|---|---|
| 5,664,172 A * | 9/1997 | Antoshenkov | 707/748 |
| 5,852,821 A | 12/1998 | Chen et al. | |
| 6,115,808 A * | 9/2000 | Arora | 712/219 |
| 6,289,335 B1 * | 9/2001 | Downing et al. | 707/769 |
| 6,334,125 B1 * | 12/2001 | Johnson et al. | 707/713 |
| 6,381,616 B1 | 4/2002 | Larson et al. | |
| 6,748,392 B1 | 6/2004 | Galindo-Legaria et al. | |
| 7,313,554 B2 * | 12/2007 | Chen et al. | 707/745 |
| 2005/0097100 A1 | 5/2005 | Galindo-Legaria et al. | |
| 2005/0187898 A1 * | 8/2005 | Chazelle et al. | 707/1 |
| 2006/0224542 A1 * | 10/2006 | Yalamanchi | 706/47 |

FOREIGN PATENT DOCUMENTS

JP    2005044303 A    2/2005

OTHER PUBLICATIONS

Cohen et al., "Deciding Equivalences Among Conjunctive Aggregate Queries," Journal of ACM, Apr. 2007, V54, N2, Article 5, 50pgs.
Diao et al., "Path Sharing and Predicate Evaluation for High-Performance XML Filtering," ACM Trans. on DB Systems, Dec. 2003, V28, N4, pp. 467-516.
Goldsmith et al., "Relational Queries Over Program Traces," OOPSLA '05, Oct. 16-20, 2005, San Diego, CA, pp. 385-402.
Koch, "On the Complexity of Nonrecursive XQuery and Functional Query Languages on Complex Values," ACM Trans. on DB Systems, Dec. 2006, V31, N4, pp. 1215-1256.

\* cited by examiner

*Primary Examiner*—Hosain T Alam
*Assistant Examiner*—Jieying Tang
(74) *Attorney, Agent, or Firm*—IP Authority, LLC; Ramraj Soundararajan; Brian Lambert

(57) ABSTRACT

Methods are described to simultaneously apply conjugates of equality, range, and in-list predicates. A first set of methods are described for the simultaneous application of equality predicates. A second set of methods are described for the simultaneous application of a mixture of range and equality predicates. A third method is described for the simultaneous applying a mixture of in-list predicates. The described methods allow for quick evaluation of complex predicates as they efficiently implement the computation done per record, while maintaining the same execution time irrespective of the number of fields.

13 Claims, 10 Drawing Sheets

METHOD FOR EVALUATING A CONJUNCTION OF EQUITY AND RANGE PREDICATES USING A CONSTANT NUMBER OF OPERATIONS

BACKGROUND OF THE INVENTION

1. Field of Invention

The present invention relates generally to the field of predicate evaluation. More specifically, the present invention is related to method for evaluating a conjunction of equity and range predicates using a constant number of operations.

2. Discussion of Related Art

Conjunctive predicates (e.g., p1 AND p2 AND . . . ) are the most common kind of predicate used in querying databases. The standard way to evaluate a conjunction of predicates on a record is via a method of the form:

```
for each predicate do:
    extract the fields that this predicate is over
    if record satisfies predicate continue
        else return that the record does not satisfy predicate
// every predicate has been verified
return that the record satisfies predicate
```

The performance of this predicate evaluation is a significant fraction of overall query performance in modern high-performance business intelligence (BI) engines that do large amounts of data scans. But at least three drawbacks make this standard method of predicate evaluation to be slow and have variable performance.

First, in prior art predicate evaluations, the evaluation time varies based on the number of predicates to be applied. For example, in the paper by Holloway et al. titled "How to Barter Bits for Chronons: Compression and Bandwidth Trade Offs for Database Scans", it was found that each extra field that is touched adds about 6-8 cycles per record for a scan, which, in turn, causes variability in scan performance.

Second, in prior art predicate evaluations, each field needs to be extracted before predicates are applied. The cost associated with such an operation is expensive, especially in newer databases where fields are not aligned at machine-word (64-bit) boundaries.

Third, in prior art predicate evaluations, the loop condition and the predicate evaluation within the loop both result in conditional branch statements. Mispredicted branches cost orders of magnitude more than regular instructions on almost all modern processors (e.g., we have timed at 40 cycles on a Pentium® family processor).

Whatever the precise merits, features, and advantages of such prior art predicate evaluations, none of them achieves or fulfills the purposes of the present invention.

SUMMARY OF THE INVENTION

The present invention, in one embodiment, provides a computer-based method to simultaneously evaluate conjunctions of equality predicates on k fields $F_1, F_2, \ldots F_k$: $F_1=L_1$ and $F_2=L_2$ and $F_k=L_k$ of a record, wherein $L_1, L_2 \ldots L_k$ represent values and fields $F_1, F_2, \ldots F_k$ are at offsets $[S_1, E_1]$, $[S_2, E_2] \ldots [S_k, E_k]$ within the record. The method of this embodiment, as implemented in computer readable program code stored in computer storage, comprises the steps of: (a) constructing a mask to extract values of the fields $F_1, F_2, \ldots F_k$ within a cell, wherein the mask comprises a bit vector M having 1s in bits $[S_1, E_1], [S_2, E_2] \ldots [S_k, E_k]$ and having 0s in remainder of bits; (b) constructing a value vector comprising a bit vector V having values $L_1, L_2 \ldots L_k$ at bit positions $[S_1, E_1], [S_2, E_2] \ldots [S_k, E_k]$, respectively, and having 0s in remainder of bits; (c) for each record, R, on which said equality predicates need to be applied, evaluating if R AND M=V; and (d) outputting results of said evaluation in (c).

In one variation, the bit vector M has 0s in bits $[S_1, E_1], [S_2, E_2] \ldots [S_k, E_k]$ and 1s in remaining bits, and the bit vector V has values $L_1, L_2 \ldots L_k$ at bit positions $[S_1, E_1], [S_2, E_2] \ldots [S_k, E_k]$, respectively, and having 1s in remainder of bits, and instead of evaluating if R AND M=V, the method comprises the step of evaluating if R OR M=V.

In another variation of the above-described method, instead of evaluating if R AND M=V, the method evaluates if (R XOR V) AND M=0.

In another embodiment, the present invention provides a computer based method to simultaneously evaluate conjunctions of range and equality predicates on k fields of a record being either $F_1, F_2, \ldots F_k$: $F_1 \leq L_1$ and $F_2 \leq L_2$ and $F_k \leq L_k$, or $F_1, F_2, \ldots F_k$: $F_1 \geq L_1$ and $F_2 \geq L_2$ and $F_k \geq L_k$, wherein $L_1, L_2 \ldots L_k$ represent values and fields $F_1, F_2, \ldots F_k$ are at offsets $[S_1, E_1], [S_2, E_2] \ldots [S_k, E_k]$ within the record. In this embodiment, the method, as implemented in computer readable program code stored in computer storage, comprises the steps of: (a) computing $B_i=S_i-C$ for said k fields, wherein C is a constant whole number (e.g., C=1); (b) constructing a mask to extract values of k bits $B_1, B_2, \ldots, B_k$, wherein the mask comprises a bit vector M having 1s in bits at k bit positions, $B_1, B_2, B_k$ having 0s in remainder of bits; (c) constructing a value vector containing values of fields $F_1, F_2, \ldots F_k$, wherein the value vector comprises a bit vector V having values $L_1, L_2 \ldots L_k$ at bit positions $[S_1, E_1], [S_2, E_2] \ldots [S_k, E_k]$, respectively, and having 0s in remainder of bits; (d) for each record, R, on which the predicates need to be applied, evaluating as follows:

```
when F_1, F_2, ... F_k: F_1 ≤ L_1 and F_2 ≤ L_2 and F_k ≤ L_k,
    evaluating ((V−R) AND M) = (V XOR R) AND M), or
when F_1, F_2, ... F_k: F_1 ≥ L_1 and F_2 ≥ L_2 and F_k ≥ L_k,
    evaluating ((R−V) AND M) = (V XOR R) AND M),
``` wherein the AND operator represents bit-wise AND of two bit vectors and said XOR operator represents bit-wise Exclusive OR of two bit vectors; and (e) outputting results of said evaluation operation in (d).

In one variation of the above-described embodiment, the method in step (d), instead of evaluating if ((V−R) AND M)=(V XOR R) AND M), evaluates if (((V−R) XOR V XOR R) AND M)=0.

In another variation of the above-described embodiment, the method in step (d), instead of evaluating if ((V−R) AND M)=(V XOR R) AND M), evaluates if ((V−R) XOR V XOR R) OR (NOT M)=(NOT M).

The present invention in another embodiment provides for a computer based method to simultaneously evaluate conjunctions of one or more range or equality predicates on k fields $F_1, F_2, \ldots F_k$ of a record, where each predicate is one of four forms: (i) $L_i \leq F_i$ or (ii) $F_i \leq U_i$ or (iii) $F_i=L_i$ or (iv) $L_i \leq F_i \leq U_i$, and wherein $L_1, L_2 \ldots L_k$ represent values and the k fields being at offsets $[S_1, E_1], [S_2, E_2] \ldots [S_k, E_k]$ of the record. The method of this embodiment comprises the steps of: (a) computing $B_i=S_i-C$ for the k fields, wherein C is a constant whole number (e.g., C=1); (b) constructing a mask to extract values of k bits $B_1, B_2, \ldots, B_k$, wherein the mask comprises a bit vector M having 1s in bits at k bit positions, $B_1, B_2, \ldots, B_k$ having 0s in remainder of bits; (c) constructing a first value vector containing lower bound values, wherein the first value vector comprises a bit vector $V_L$ having 0s everywhere except one or more of the following: $L_1$ at bit positions $[S_1, E_1]$, $L_2$ at bit positions $[S_2, E_2]$ ... $L_k$ at bit positions $[S_k, E_k]$; (d) constructing a second value vector containing upper bound values, wherein the second value vector comprises a bit vector $V_U$ having 1s everywhere except one or more of the following: $U_1$ at bit positions $[S_1, E_1]$, $U_2$ at bit positions $[S_2, E_2]$ ... $U_k$ at bit positions $[S_k, E_k]$; (e) for each record, R, on which said predicates need to be applied, evaluating $(((V_U-R)\ XOR\ (R-V_L))\ AND\ M) = (V_U\ XOR\ V_L)\ AND\ M)$, wherein the AND operator represents bit-wise AND of two bit vectors and said XOR operator represents bit-wise Exclusive OR of two bit vectors; and (f) outputting results of the evaluation operation in (e).

In an extended embodiment, the above-described method further comprises the step of precomputing $(V_U\ XOR\ V_L)\ AND\ M$, and evaluating remainder of expression in (e) on a per record basis.

In a variation to the above-described embodiment, the method, in step (e), evaluates if $((V_U-R)\ XOR\ (R-V_L)\ XOR\ VuXOR\ V_L)\ AND\ M=0$.

In another variation to the above-described embodiment, the method, in step (e), evaluates if $((V_U-R)\ XOR\ (R-V_L)\ XOR\ V_U\ XOR\ V_L)\ OR\ (NOT\ M) = (NOT\ M)$.

The present invention, in another embodiment, provides for a computer based method to simultaneously evaluate conjunctions of a mixture of in-list predicates on k fields $F_1$, $F_2$, ... $F_k$ of the form $F_1$ in $(L_{11}, L_{12} \ldots L_{1n})$ and $F_2$ in $(L_{21}, L_{22} \ldots L_{2n})$ and ... $F_k$ in $(L_{k1}, L_{k2} \ldots L_{kn})$, wherein the k fields are at offsets $[S_1, E_1], [S_2, E_2] \ldots [S_k, E_k]$. In this embodiment, the method, as implemented in computer readable program code stored in computer storage, comprises the steps of: (a) constructing a first mask to extract values of k fields, wherein the first mask comprises a bit vector M having 1s in bits $[S_1, E_1], [S_2, E_2] \ldots [S_k, E_k]$ and having 0s in remainder of bits; (b) constructing a second mask to extract most significant bit of each field, wherein the second mask comprises a bit vector S having 0s in bits $S_1, S_2, \ldots, S_k$ and having 1s in remainder of bits; (c) for each 1 through n, computing a bit vector of values $V_1, V_2, \ldots, V_n$, wherein $V_i$ has 0s in all bits except values $L_{1i}, L_{2i}, \ldots L_{ki}$ at $[S_1, E_1], [S_2, E_2] \ldots [S_k, E_k]$, respectively; (d) for each record, R, on which said predicates need to be applied, evaluating n numbers as follows:

$N_1 = ((((V_1\ XOR\ R)\ AND\ S) + S)\ OR\ (V_1\ XOR\ R))$;
$N_2 = ((((V_2\ XOR\ R)\ AND\ S) + S)\ OR\ (V_2\ XOR\ R))$; ...
$N_n = ((((V_n\ XOR\ R)\ AND\ S) + S)\ OR\ (V_n\ XOR\ R))$;

and then evaluating the following condition:

$((N_1\ AND\ N_2\ AND \ldots N_n)\ OR\ S) = S$ wherein the AND operator represents bit-wise AND of two bit vectors, the XOR operator represents bit-wise Exclusive OR of two bit vectors, and the + operator represents addition, and OR represents bit-wise OR; and (e) outputting results of said evaluation operation in (d).

DESCRIPTION OF THE PREFERRED EMBODIMENTS

Figure 1:
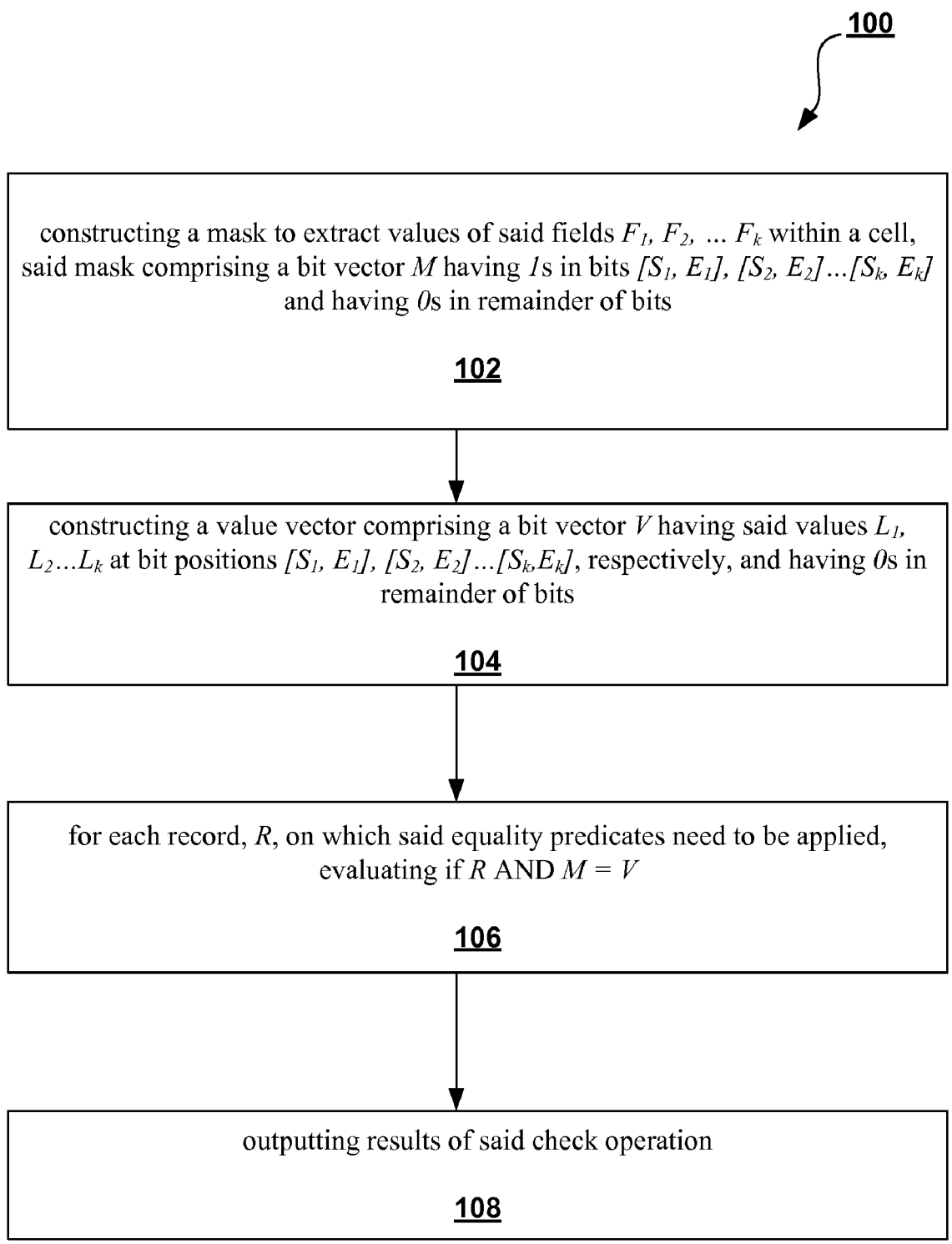
FIGS. 1-3 illustrate various examples of the first embodiment's computer-based method to simultaneously evaluate conjunctions of equality predicates.

The paper by Raman et al. entitled, "Constant-Time Query Processing," to be published in the Proceedings of the 24th IEEE International Conference on Data Engineering, held Apr. 7-12, 2008, in Cancun, Mexico, attached in Appendix A, provides additional details regarding a simplified database architecture that achieves constant time query processing.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention teaches a method to efficiently apply conjunctions of one or more predicates (a predicate is a condition such as weight<=150) on fields in a database, such as:

```
age>10 AND
salary between [10000,20002] AND
state in ('CA', 'MI') AND
hairColor in ('black', 'blue', 'orange') AND
weight< 150 AND
shoeSize = 10
```

In the example above, conditions such as 'shoeSize=10' are called equality predicates and conditions such as 'age>10' and 'salary between [10000,20002]' are called range predicates. Conditions such as 'hairColor in ('black', 'blue', 'orange')' are called in-list predicates.

Conjunction refers to all of the clauses that have to be simultaneously true for the overall condition to be satisfied. Such conjunctions are the most common kinds of predicates that occur in databases, search engines, etc.

It should be noted that the present invention's methods apply even in instances where the conjunction is only a part of the overall predicate. For example:

```
(age>10 AND salary between 10000 and 20002) AND
((weight< 150 AND shoeSize = 10) OR (state in ('CA', 'MI') AND
(hairColor in ('black', 'blue', 'orange')))
```

In the above-example, the overall predicate is not a conjunction because of the ORs, but our methods apply to each of the underlined parts.

The present invention's methods apply conjunctions simultaneously on fields in a database. The present invention is based on the following conditions, wherein these conditions apply to many of the current databases:

the fields involved in the predicate are at fixed offsets within each record (if some fields are not at fixed offsets, our methods still apply to the part of the predicate that is on fields at fixed offsets)

the predicates can be evaluated on the fields as they are represented within the record.

First Embodiment

Applying Equality Predicates Simultaneously

Treat each record R as a single bit-vector of N bits (N is usually set to be a machine word size, such as 8, 16, 32, or 64 bits and if R is too large to fit into a single machine word, it is broken up into multiple words). If equality predicates are evaluated on k fields $F_1 \ldots F_k$: $F_1=L_1$ and $F_2=L_2$ and $\ldots F_k=L_k$ (the fields $F_1 \ldots F_k$ are the attributes of the record, such as shoeSize in the previous example and $L_1 \ldots L_k$ are the corresponding constants, such as 10 for the condition 'shoeSize=10', wherein such constants are also referred to as literals). Fields $F_1 \ldots F_k$ are at bit offsets $[S_1, E_1]$, $[S_2, E_2], \ldots [S_k, E_k]$ respectively, i.e., the first field lies in bits $S_1$ through $E_1$ of the record, the second field lies in bits $S_2$ through $E_2$ of the record, and so on. The corresponding literals are $L_1, L_2, \ldots L_k$. The method of the first embodiment, computes a bit-wise AND of the tuple with a pre-computed mask that has the literals at the same positions as the corresponding fields, and check if the result is equal to the mask.

FIG. 1 illustrates an example of the first embodiment's computer-based method to simultaneously evaluate conjunctions of equality predicates on k fields $F_1, F_2, \ldots F_k$: $F_1=L_1$ and $F_2=L_2$ and $F_k=L_k$ of a record, with $L_1, L_2 \ldots L_k$ representing values and fields $F_1, F_2, \ldots F_k$ being at offsets $[S_1, E_1]$, $[S_2, E_2] \ldots [S_k, E_k]$ within the record, wherein an offset [X, Y] represents bits X through Y.

Method 100, according to this example, is implemented in computer readable program code stored in computer storage and comprises the steps of: (a) constructing a mask to extract values of said fields $F_1, F_2, \ldots F_k$ within a cell, wherein the mask comprises a bit vector M having 1s in bits $[S_1, E_1]$, $[S_2, E_2] \ldots [S_k, E_k]$ and having 0s in remainder of bits—step 102; (b) constructing a value vector comprising a bit vector V having the values $L_1, L_2 \ldots L_k$ at bit positions $[S_1, E_1]$, $[S_2, E_2] \ldots [S_k, E_k]$, respectively, and having 0s in remainder of bits—step 104; (c) for each record, R, on which the equality predicates need to be applied, evaluating if R AND M=V—step 106; and (d) outputting results of the evaluation in (c)—step 108.

Variations of the method of FIG. 1 are envisioned and are within the scope of the present invention.

Figure 2:
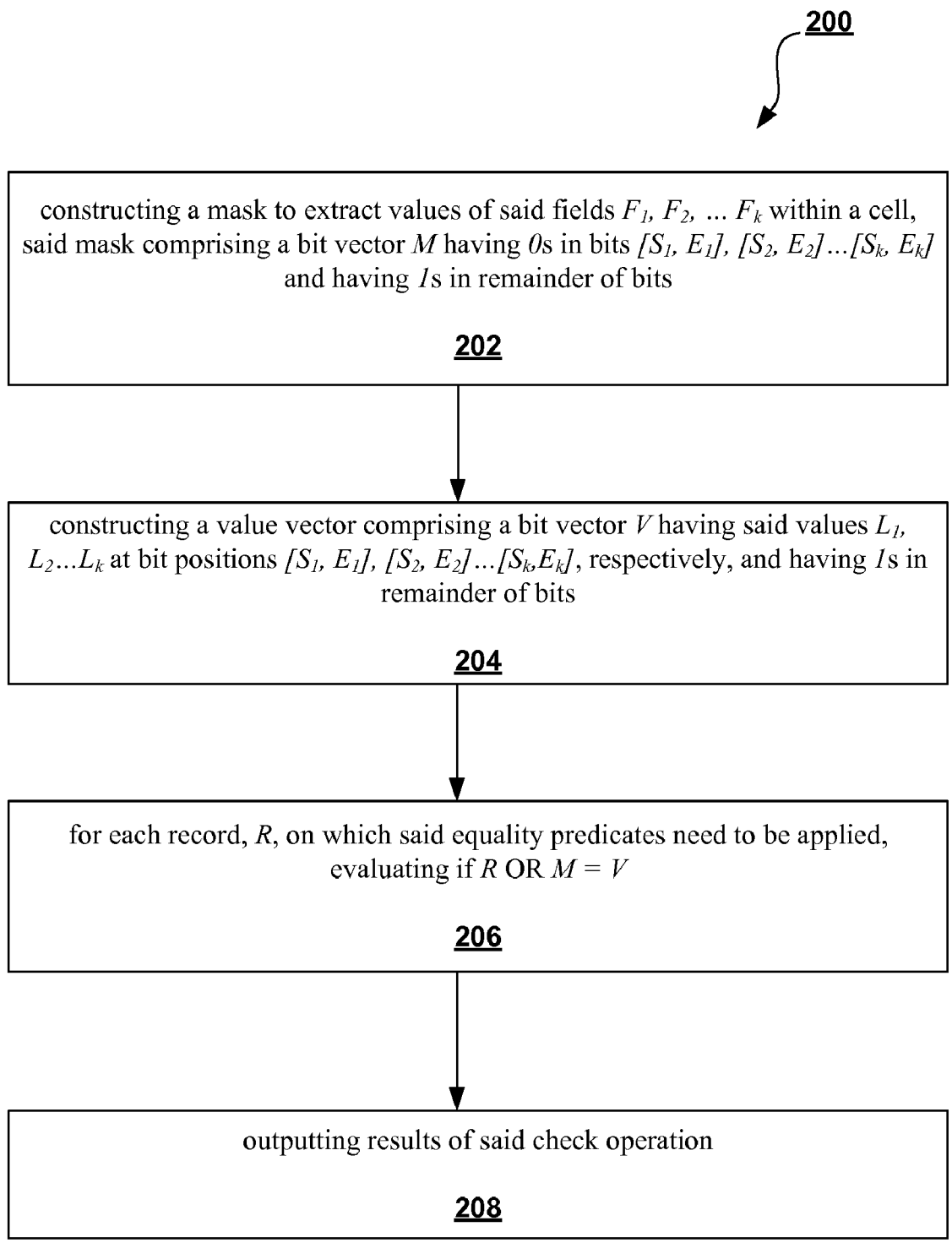

For example, FIG. 2 illustrates such a variation of the method of the first embodiment. Method 200, according to this example, is implemented in computer readable program code stored in computer storage and comprises the steps of: (a) constructing a mask to extract values of said fields $F_1$, $F_2, \ldots F_k$ within a cell, wherein the mask comprises a bit vector M having 0s in bits $[S_1, E_1]$, $[S_2, E_2] \ldots [S_k, E_k]$ and having 1s in remainder of bits—step 202; (b) constructing a value vector comprising a bit vector V having the values $L_1$, $L_2 \ldots L_k$ at bit positions $[S_1, E_1]$, $[S_2, E_2] \ldots [S_k, E_k]$, respectively, and having 1s in remainder of bits—step 204; (c) for each record, R, on which the equality predicates need to be applied, evaluating if R OR M=V—step 206; and (d) outputting results of the evaluation in (c)—step 208.

Figure 3:
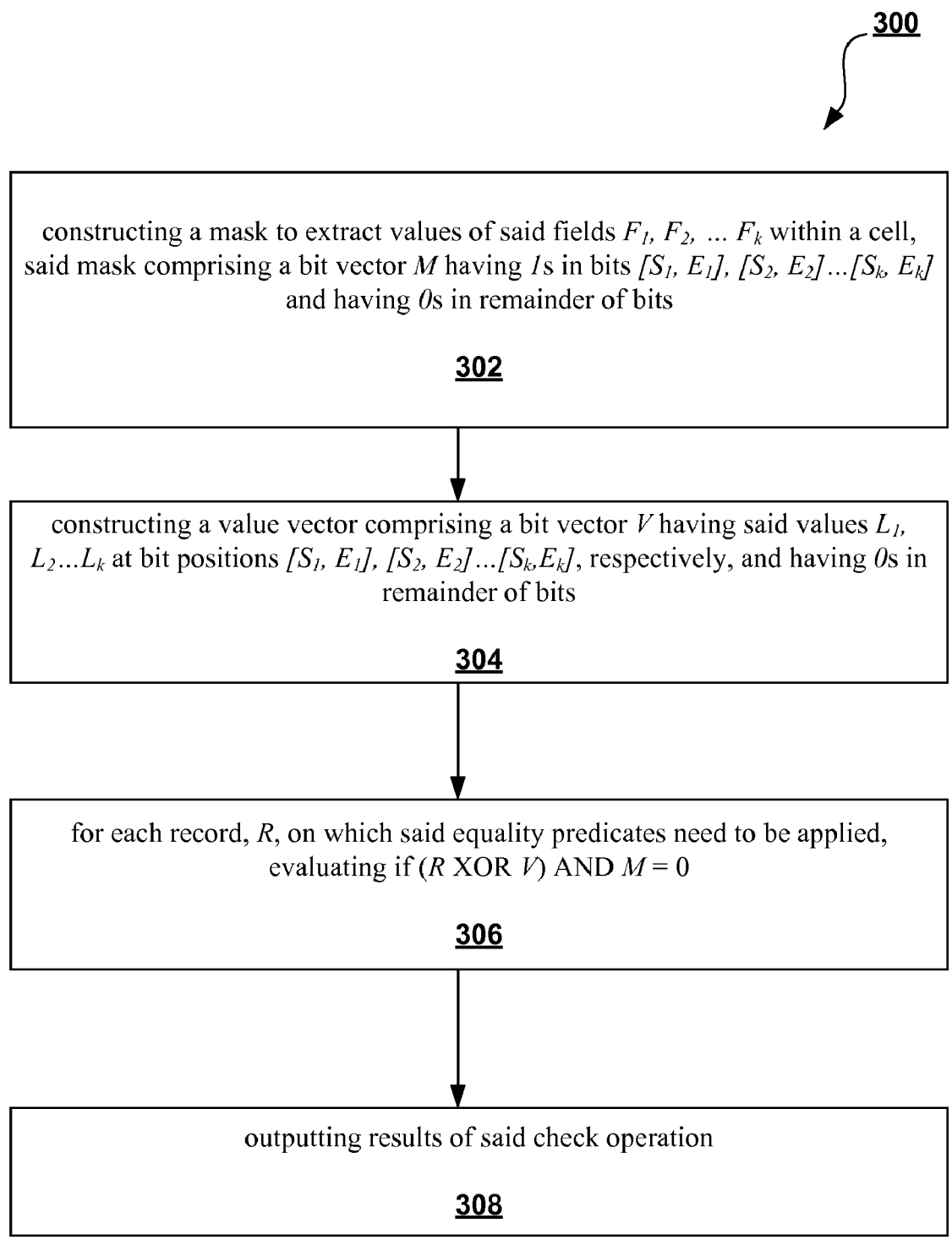

FIG. 3 illustrates yet another variation of the method of the first embodiment. Method 300, according to this example, is implemented in computer readable program code stored in computer storage and comprises the steps of: (a) constructing a mask to extract values of said fields $F_1, F_2, \ldots F_k$ within a cell, wherein the mask comprises a bit vector M having 1s in bits $[S_1, E_1]$, $[S_2, E_2] \ldots [S_k, E_k]$ and having 0s in remainder of bits—step 302; (b) constructing a value vector comprising a bit vector V having the values $L_1, L_2 \ldots L_k$ at bit positions $[S_1, E_1]$, $[S_2, E_2] \ldots [S_k, E_k]$, respectively, and having 0s in remainder of bits—step 304; (c) for each record, R, on which the equality predicates need to be applied, evaluating if (R XOR V) AND M=0—step 306; and (d) outputting results of the evaluation in (c)—step 308.

The benefit of the methods of the first embodiment is that computation done per record (a bitwise and an equality comparison) is efficiently done (with hardware or software instructions), and takes the same amount of time irrespective of k. This allows for very complex predicates to be evaluated quickly.

It should be noted that bit-wise AND could be implemented by combinations of other operators, and such modifications are considered within the scope of the present invention.

Second Embodiment

Applying a Mixture of Range and Equality Predicates Simultaneously

In this embodiment, equality predicates (such as 'shoeSize=10') are rewritten into range predicates such as shoeSize<=10 and shoeSize>=10. Predicates such as 'weight<150' are rewritten into predicates of the form 'weight<=149' by subtracting 1. Conjunction of predicates are of two forms: field<=literal, field>=literal.

Figure 4:
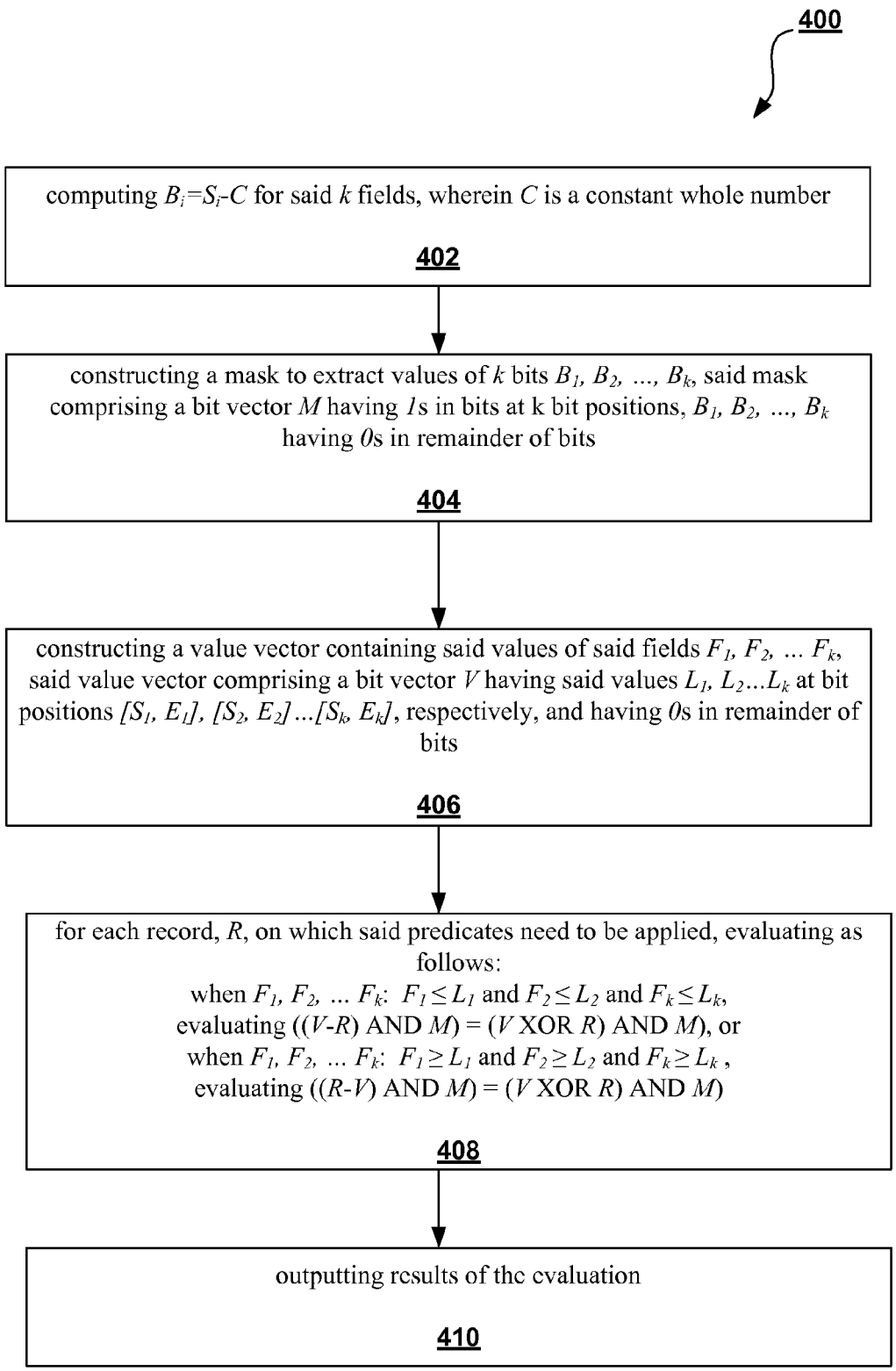
FIGS. 4-9 illustrate various examples of the second embodiment's computer-based method to simultaneously evaluate range and equality predicates.

FIG. 4 illustrates an example of the second embodiment's computer-based method to simultaneously evaluate conjunctions of range and equality predicates on k fields of a record being either $F_1, F_2, \ldots F_k$: $F_1 \leq L_1$ and $F_2 \leq L_2$ and $F_k \leq L_k$, or $F_1, F_2, \ldots F_k$: $F_1 \geq L_1$ and $F_2 \geq L_2$ and $F_k \geq L_k$, wherein $L_1$, $L_2 \ldots L_k$ represent values and the fields $F_1, F_2, \ldots F_k$ are at offsets $[S_1, E_1]$, $[S_2, E_2] \ldots [S_k, E_k]$ within the record. As mentioned earlier, an offset [X, Y] represents all bits X through Y.

Method 400 of FIG. 4, as implemented in computer readable program code stored in computer storage, comprises the steps of: (a) computing $B_i=S_i-C$ for k fields, wherein C is a constant whole number (e.g., C=1)—step 402; (b) constructing a mask to extract values of k bits $B_1, B_2, \ldots, B_k$, wherein the mask comprises a bit vector M having 1s in bits at k bit positions, $B_1, B_2, \ldots, B_k$ having 0s in remainder of bits—step 404; (c) constructing a value vector containing the values of fields $F_1, F_2, \ldots F_k$, wherein the value vector comprises a bit vector V having the values $L_1, L_2 \ldots L_k$ at bit positions $[S_1$, $E_1]$, $[S_2, E_2] \ldots [S_k, E_k]$, respectively, and having 0s in remainder of bits—step 406; (d) for each record, R, on which the predicates need to be applied, evaluating as follows: when $F_1, F_2, \ldots F_k$: $F_1 \leq L_1$ and $F_2 \leq L_2$ and $F_k \leq L_k$, evaluating ((V−R) AND M)=(V XOR R) AND M), or, when $F_1, F_2, \ldots$ $F_k$: $F_1 \geq L_1$ and $F_2 \geq L_2$ and $F_k \geq L_k$, evaluating ((R−P) AND M)=(V XOR R) AND M), wherein the AND operator represents bit-wise AND of two bit vectors and the XOR operator represents bit-wise Exclusive OR of two bit vectors—step 408; and (e) outputting results of the evaluation operation in (d)—step 410.

Variations of the method of FIG. 4 are envisioned and are within the scope of the present invention.

Figure 5:
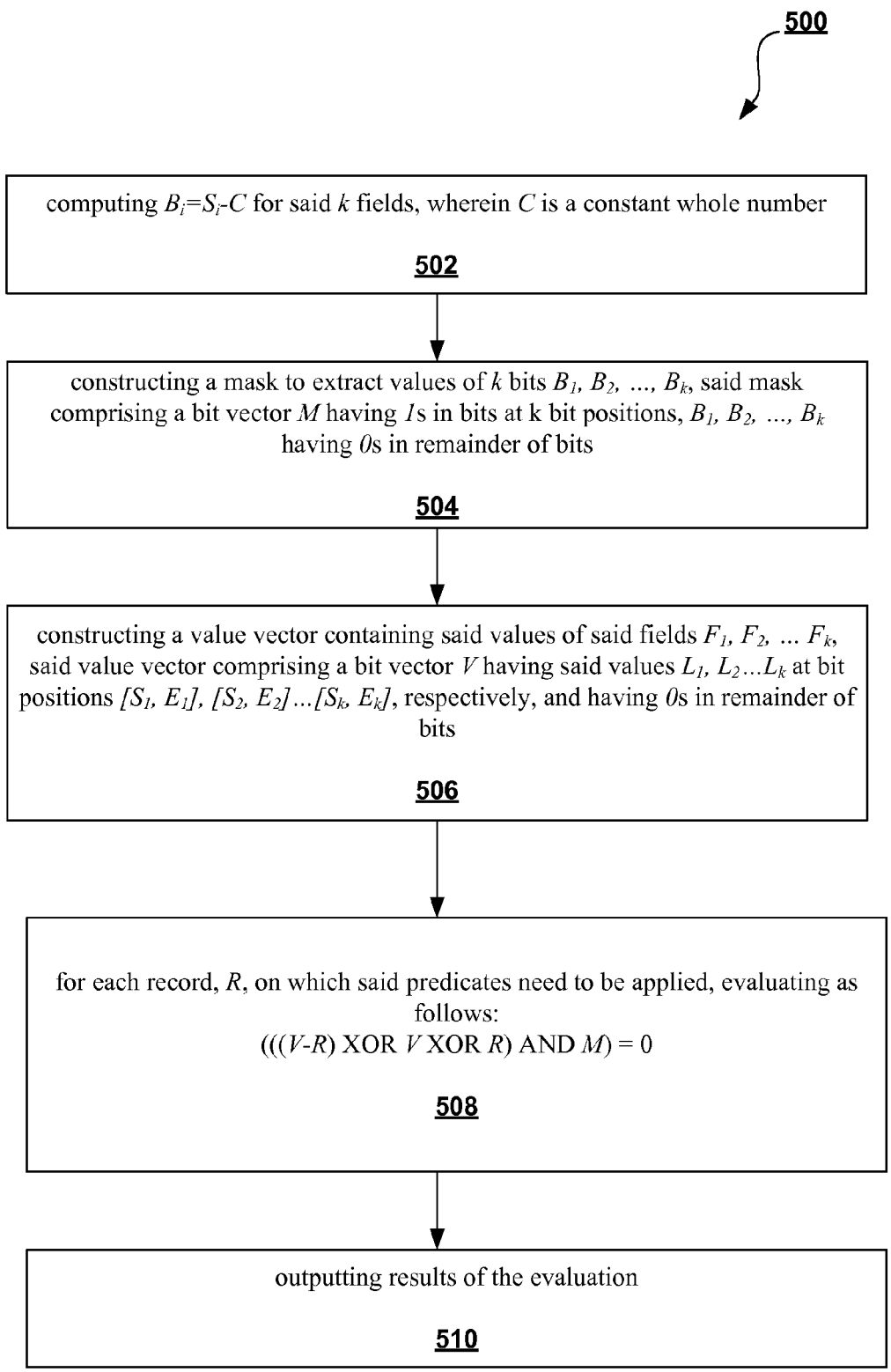

For example, method 500 of FIG. 5, as implemented in computer readable program code stored in computer storage, comprises the steps of: (a) computing $B_i=S_i-C$ for k fields, wherein C is a constant whole number (e.g., C=1)—step 502; (b) constructing a mask to extract values of k bits $B_1$, $B_2, \ldots, B_k$, wherein the mask comprises a bit vector M having 1s in bits at k bit positions, $B_1, B_2, \ldots, B_k$ having 0s in remainder of bits—step 504; (c) constructing a value vector containing the values of fields $F_1, F_2, \ldots F_k$, wherein the value vector comprises a bit vector V having the values $L_1, L_2 \ldots L_k$ at bit positions $[S_1, E_1], [S_2, E_2] \ldots [S_k, E_k]$, respectively, and having 0s in remainder of bits—step 506; (d) for each record, R, on which the predicates need to be applied, evaluating (((V−R) XOR V XOR R) AND M)=0, wherein the AND operator represents bit-wise AND of two bit vectors and the XOR operator represents bit-wise Exclusive OR of two bit vectors—step 508; and (e) outputting results of the evaluation operation in (d)—step 510.

Figure 6:
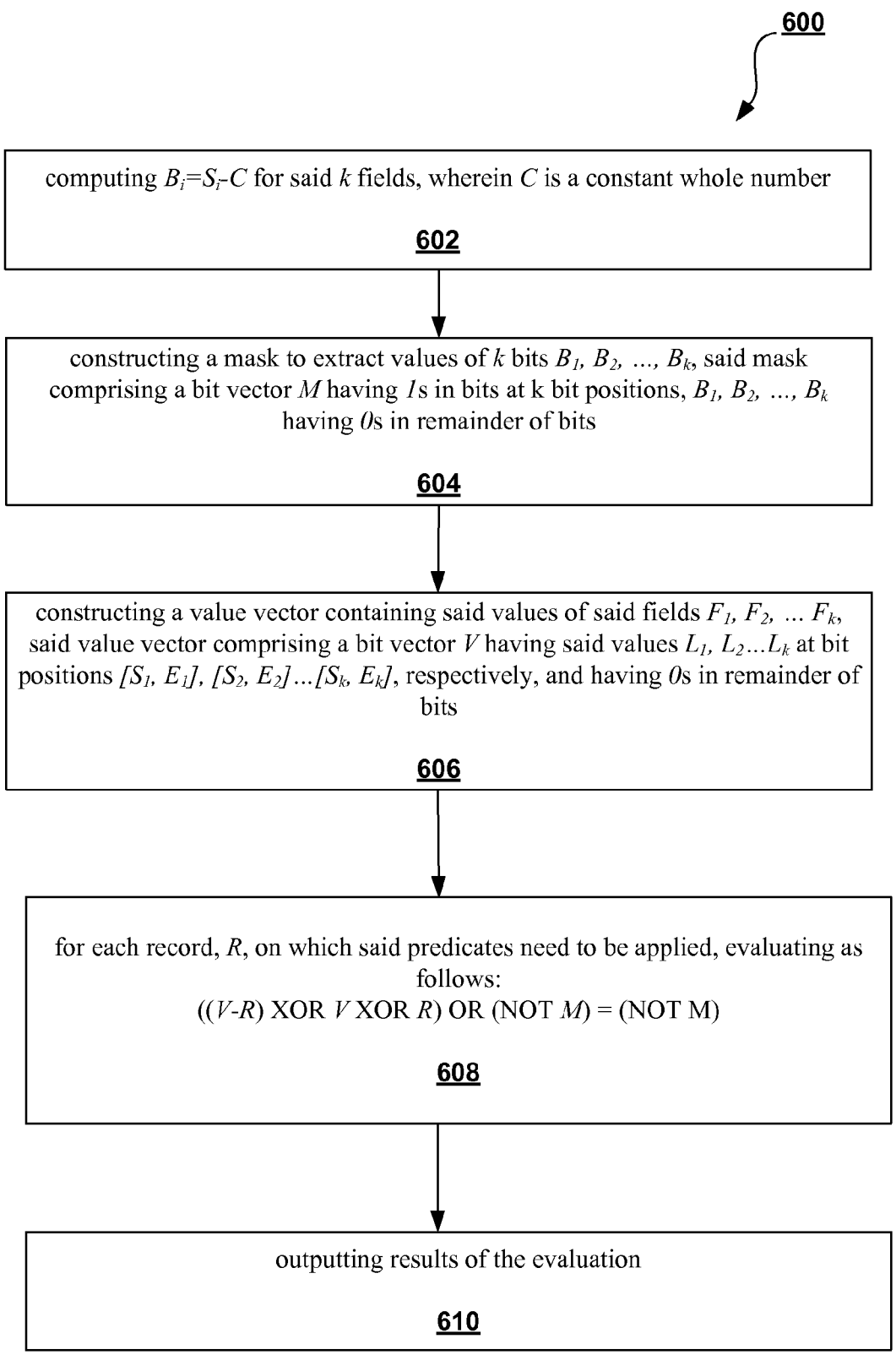

As another example, method 600 of FIG. 6, as implemented in computer readable program code stored in computer storage, comprises the steps of: (a) computing $B_i = S_i - C$ for k fields, wherein C is a constant whole number (e.g., C=1)—step 602; (b) constructing a mask to extract values of k bits $B_1, B_2, \ldots, B_k$, wherein the mask comprises a bit vector M having 1s in bits at k bit positions, $B_1, B_2, \ldots, B_k$ having 0s in remainder of bits—step 604; (c) constructing a value vector containing the values of fields $F_1, F_2, \ldots F_k$, wherein the value vector comprises a bit vector V having the values $L_1, L_2 \ldots L_k$ at bit positions $[S_1, E_1], [S_2, E_2] \ldots [S_k, E_k]$, respectively, and having 0s in remainder of bits—step 606; (d) for each record, R, on which the predicates need to be applied, evaluating ((V−R) XOR V XOR R) OR (NOT M)=(NOT M), wherein the AND operator represents bit-wise AND of two bit vectors and the XOR operator represents bit-wise Exclusive OR of two bit vectors—step 608; and (e) outputting results of the evaluation operation in (d)—step 610.

Figure 7:
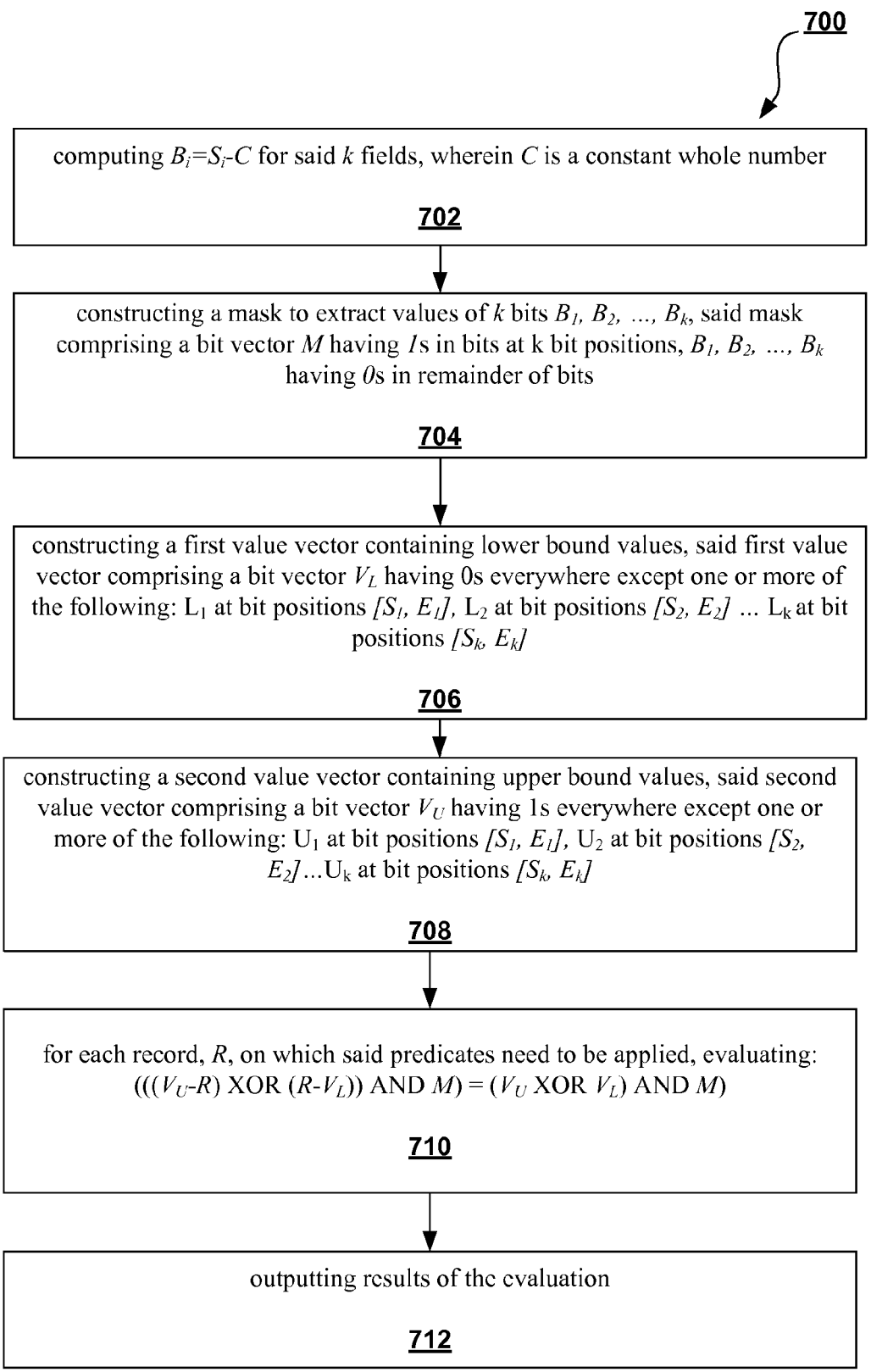

FIG. 7 illustrates yet another variation in the method of the second embodiment. FIG. 7 illustrates a computer based method to simultaneously evaluate conjunctions of one or more range or equality predicates on k fields $F_1, F_2, \ldots F_k$ of a record, where each predicate is one of four forms: (i) $L_i \leq F_i$ or (ii) $F_i \leq U_i$ or (iii) $F_i = L_i$ or (iv) $L_i \leq F_i \leq U_i$, wherein $L_1, L_2 \ldots L_k$ represent values, and the k fields are at offsets $[S_1, E_1], [S_2, E_2] \ldots [S_k, E_k]$ of said record.

Method 700 of FIG. 7, as implemented in computer readable program code stored in computer storage, comprises the steps of: (a) computing $B_i = S_i - C$ for k fields, wherein C is a constant whole number (e.g., C=1)—step 702; (b) constructing a mask to extract values of k bits $B_1, B_2, \ldots, B_k$, wherein the mask comprises a bit vector M having 1s in bits at k bit positions, $B_1, B_2, \ldots, B_k$ having 0s in remainder of bits—step 704; (c) constructing a first value vector containing lower bound values, wherein the first value vector comprises a bit vector $V_L$ having 0s everywhere except one or more of the following: $L_1$ at bit positions $[S_1, E_1]$, $L_2$ at bit positions $[S_2, E_2] \ldots L_k$ at bit positions $[S_k, E_k]$—step 706; (d) constructing a second value vector containing upper bound values, wherein the second value vector comprises a bit vector Vu having 1s everywhere except one or more of the following: $U_1$ at bit positions $[S_1, E_1]$, $U_2$ at bit positions $[S_2, E_2] \ldots U_k$ at bit positions $[S_k, E_k]$—step 708; (e) for each record, R, on which said predicates need to be applied, evaluating $(((V_U - R) \text{ XOR } (R - V_L)) \text{ AND } M) = ((V_U \text{ XOR } V_L) \text{ AND } M)$—step 710, wherein the AND operator represents bit-wise AND of two bit vectors and the XOR operator represents bit-wise Exclusive OR of two bit vectors; and (f) outputting results of said evaluation operation in (e)—step 712.

In one example, the value of $((V_U \text{ XOR } V_L) \text{ AND } M)$ is pre-computed, such that only the remaining part of the expression (i.e., $(((V_U - R) \text{ XOR } (R - V_L)) \text{ AND } M))$ is evaluated on a per-record basis: using two subtractions, an XOR, a bit-wise ANDs and a bitwise comparison (all of which can be performed efficiently on most current processors using, for example, hardware instructions).

Figure 8:
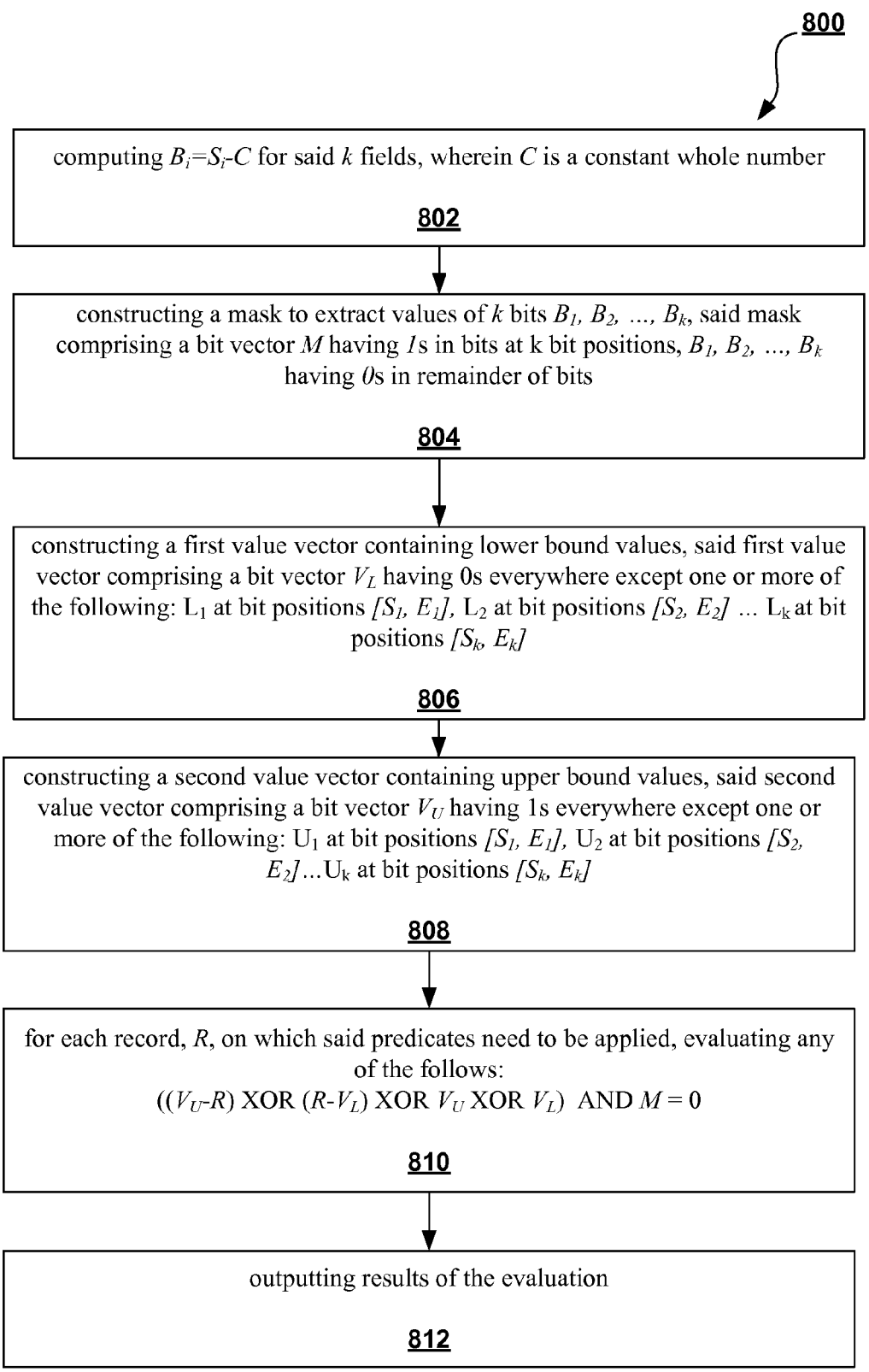

Variations of the method of FIG. 7 are envisioned and are within the scope of the present invention. For example, method 800 of FIG. 8, as implemented in computer readable program code stored in computer storage, comprises the steps of: (a) computing $B_i = S_i - C$ for k fields, wherein C is a constant whole number (e.g., C=1)—step 802; (b) constructing a mask to extract values of k bits $B_1, B_2, \ldots, B_k$, wherein the mask comprises a bit vector M having 1s in bits at k bit positions, $B_1, B_2, \ldots, B_k$ having 0s in remainder of bits—step 804; (c) constructing a first value vector containing lower bound values, wherein the first value vector comprises a bit vector $V_L$ having 0s everywhere except one or more of the following: $L_1$ at bit positions $[S_1, E_1]$, $L_2$ at bit positions $[S_2, E_2] \ldots L_k$ at bit positions $[S_k, E_k]$—step 806; (d) constructing a second value vector containing upper bound values, wherein the second value vector comprises a bit vector Vu having 1s everywhere except one or more of the following: $U_1$ at bit positions $[S_1, E_1]$, $U_2$ at bit positions $[S_2, E_2] \ldots U_k$ at bit positions $[S_k, E_k]$—step 808; (e) for each record, R, on which said predicates need to be applied, evaluating $((V_U - R) \text{ XOR } (R - V_L) \text{ XOR } Vu \text{ XOR } V_L) \text{ AND } M = 0$—step 810, wherein the AND operator represents bit-wise AND of two bit vectors and the XOR operator represents bit-wise Exclusive OR of two bit vectors; and (f) outputting results of said evaluation operation in (e)—step 812.

Figure 9:
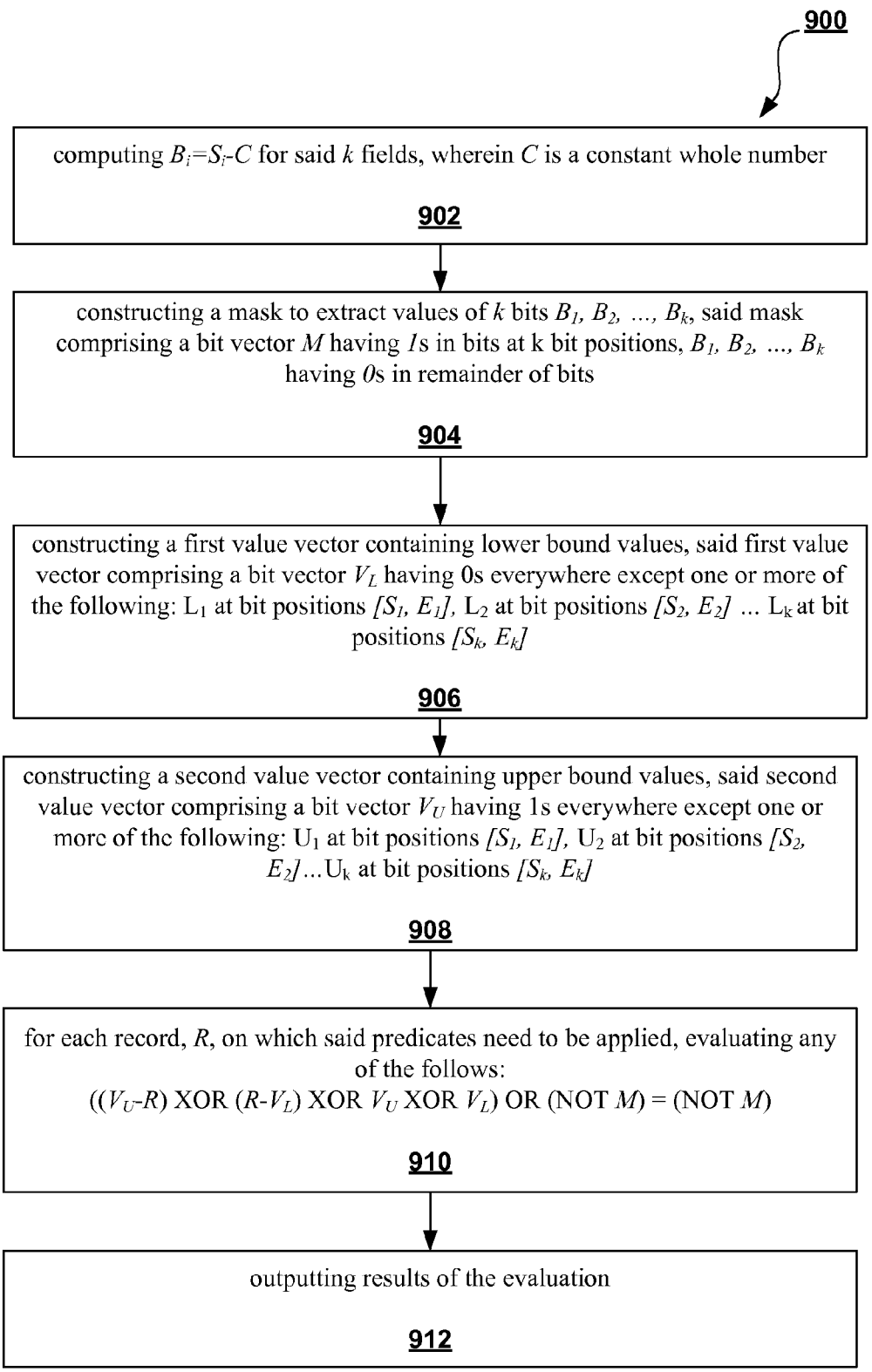

Another variation of the method of FIG. 7 is shown in FIG. 9. Method 900 of FIG. 9, as implemented in computer readable program code stored in computer storage, comprises the steps of: (a) computing $B_i = S_i - C$ for k fields, wherein C is a constant whole number (e.g., C=1)—step 902; (b) constructing a mask to extract values of k bits $B_1, B_2, \ldots B_k$, wherein the mask comprises a bit vector M having 1s in bits at k bit positions, $B_1, B_2, \ldots, B_k$ having 0s in remainder of bits—step 904; (c) constructing a first value vector containing lower bound values, wherein the first value vector comprises a bit vector $V_L$ having 0s everywhere except one or more of the following: $L_1$ at bit positions $[S_1, E_1]$, $L_2$ at bit positions $[S_2, E_2] \ldots L_k$ at bit positions $[S_k, E_k]$—step 906; (d) constructing a second value vector containing upper bound values, wherein the second value vector comprises a bit vector Vu having 1s everywhere except one or more of the following: $U_1$ at bit positions $[S_1, E_1]$, $U_2$ at bit positions $[S_2, E_2] \ldots U_k$ at bit positions $[S_k, E_k]$—step 908; (e) for each record, R, on which said predicates need to be applied, evaluating $((V_U - R) \text{ XOR } (R - V_L) \text{ XOR } V_U \text{ XOR } V_L) \text{ OR } (\text{NOT } M) = (\text{NOT } M)$—step 910, wherein the AND operator represents bit-wise AND of two bit vectors and the XOR operator represents bit-wise Exclusive OR of two bit vectors; and (f) outputting results of said evaluation operation in (e)—step 912.

The benefit of the methods of the second embodiment is that computation done per record (a bitwise and an equality comparison) is efficiently done (with hardware or software instructions), and takes the same amount of time irrespective of k. This allows for very complex predicates to be evaluated quickly.

Embodiment 3

Applying a Mixture of In-List Predicates Simultaneously

Figure 10:
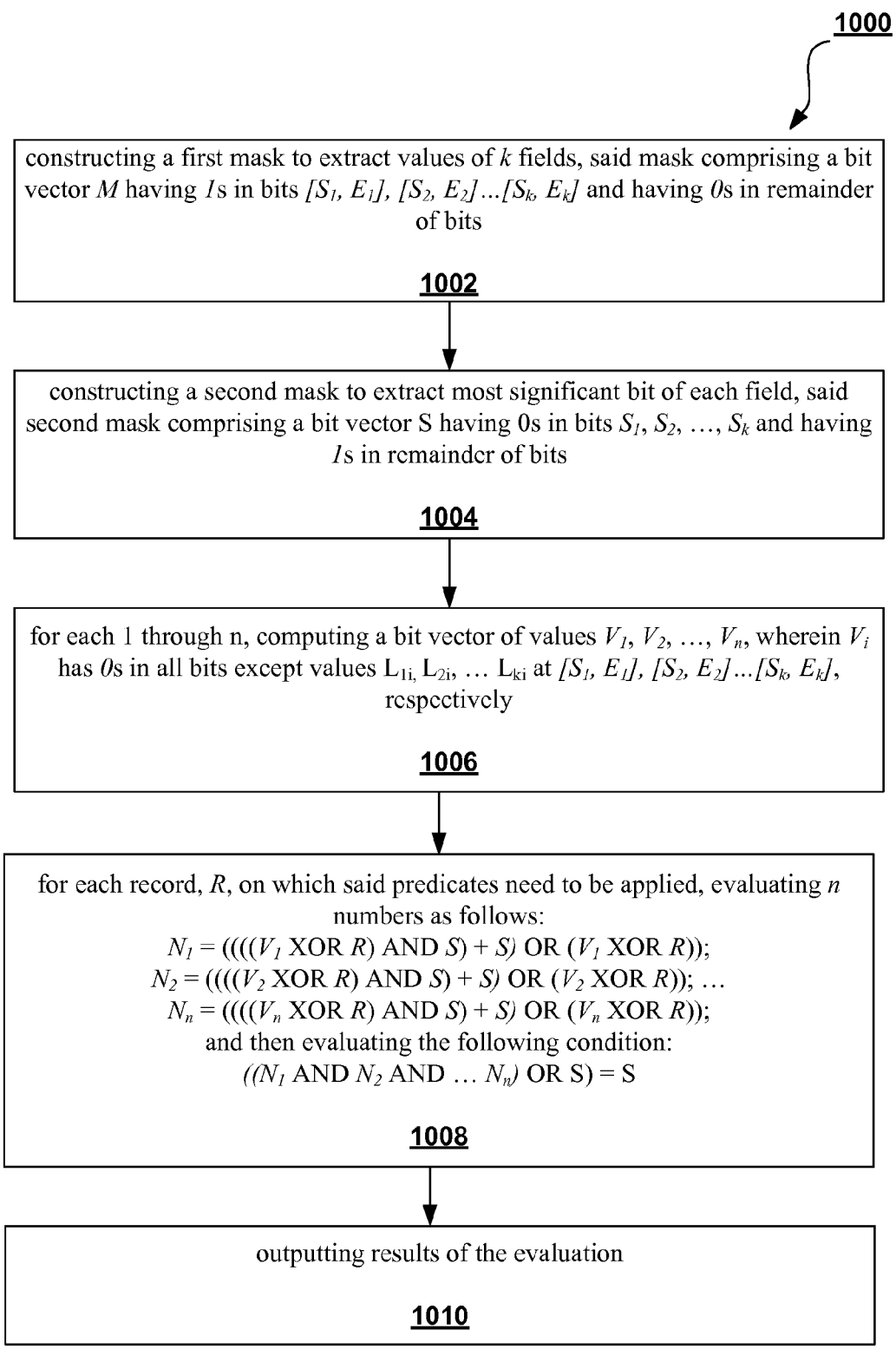
FIG. 10 illustrates an example of the third embodiment's computer-based method to simultaneously evaluate a mixture of in-list predicates.

FIG. 10 illustrates an example of the third embodiment's computer-based method to simultaneously evaluating conjunctions of a mixture of in-list predicates on k fields $F_1, F_2, \ldots F_k$ of the form $F_1$ in $(L_{11}, L_{12} \ldots L_{1n})$ and $F_2$ in $(L_{21}, L_{22} \ldots L_{2n})$ and $\ldots F_k$ in $(L_{k1}, L_{k2} \ldots L_{kn})$, wherein the k fields are at offsets $[S_1, E_1], [S_2, E_2] \ldots [S_k, E_k]$.

Method 1000 of FIG. 10, as implemented in computer readable program code stored in computer storage, comprises the steps of: (a) constructing a first mask to extract values of k fields, wherein the mask comprises a bit vector M having 1s in bits $[S_1, E_1], [S_2, E_2] \ldots [S_k, E_k]$ and having 0s in remainder of bits—step 1002; (b) constructing a second mask to extract most significant bit of each field, wherein the second mask comprises a bit vector S having 0s in bits $S_1, S_2, \ldots, S_k$ and having 1s in remainder of bits—step 1004; (c) for each 1 through n, computing a bit vector of values $V_1, V_2, \ldots, V_n$, wherein $V_i$ has 0s in all bits except values $L_{1i}, L_{2i}, \ldots L_{ki}$ at $[S_1, E_1], [S_2, E_2] \ldots [S_k, E_k]$, respectively—step 1006; (d) for each record, R, on which said predicates need to be applied, evaluating n numbers as follows—step 1008:

$N_1 = ((((V_1 \text{ XOR } R) \text{ AND } S)+S) \text{ OR } (V \text{ XOR } R));$
$N_2 = ((((V_2 \text{XOR } R) \text{ AND} S)+S) \text{ OR } (V_2 \text{XOR } R)); \ldots$
$N_n = ((((V_n \text{ XOR } R) \text{ AND } S)+S) \text{ OR } (V \text{ XOR } R));$ and then evaluating the following condition:

$((N_1 \text{ AND } N_2 \text{ AND} \ldots N_n) \text{ OR } S) = S$ wherein said AND operator represents bit-wise AND of two bit vectors, said XOR operator represents bit-wise Exclusive OR of two bit vectors, + represents subtraction, and OR represents bit-wise OR; and (e) outputting results of said evaluation operation in (d)—step 1010.

The benefit of the method of the third embodiment is that computation done per record (a bitwise and an equality comparison) is efficiently done (with hardware or software instructions), and takes the same amount of time irrespective of k. This allows for very complex predicates to be evaluated quickly.

In one example, the k fields $F_1, F_2, \ldots F_k$ described in the above-mentioned methods associated with embodiments 1 through 3 have a single codeword length.

In another example, evaluations described in the above-mentioned methods associated with embodiments 1 through 3 are computed exclusively via processor instructions.

In yet another example, the computer-based methods of embodiments 1 through 3 are used in constant-time query processing.

Additionally, the present invention provides for an article of manufacture comprising computer readable program code contained within implementing one or more modules to implement each of the above described methods of FIGS. 1 through 10. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The invention claimed is:

1. A computer based method to simultaneously evaluate conjunctions of range and equality predicates on k fields of a record, said method implemented in computer readable program code stored in computer storage, said method comprising the steps of:
(a) computing $B_1 = S_1 - C$ for said k fields, wherein C is a constant whole number and said k fields being either $F_1, F_2, \ldots F_k$: $F_1 \leq L_1$ and $F_2 \leq L_2$ and $F_k \leq L_k$, or $F_1, F_2, \ldots F_k$: $F_1 \geq L_1$ and $F_2 \geq L_2$ and $F_k \geq L_k$, said $L_1, L_2 \ldots L_k$ representing values and said k fields $F_1, F_2, \ldots F_k$ being at offsets $[S_1, E_1], [S_2, E_2] \ldots [S_k, E_k]$ within said record, wherein offset [X, Y] represents bits X through Y;

(b) constructing a mask to extract values of k bits $B_1, B_2, \ldots, B_k$, said mask comprising a bit vector M having 1s in bits at k bit positions, $B_1, B_2, B_k$ having 0s in remainder of bits;

(c) constructing a value vector containing said values of said k fields $F_1, F_2, \ldots F_k$, said value vector comprising a bit vector V having said values $L_1, L_2 \ldots L_k$ at bit positions $[S_1, E_1], [S_2, E_2] \ldots [S_k, E_k]$, respectively, and having 0s in remainder of bits;

(d) for each record, R, on which said predicates need to be applied, evaluating as part of constant-time query processing as follows:

when $F_1, F_2, \ldots F_k$: $F_1 \leq L_1$ and $F_2 \leq L_2$ and $F_k \leq L_k$, evaluating $((V-R) \text{ AND } M) = (V \text{ XOR } R) \text{ AND } M)$, or when $F_1, F_2, \ldots F_k$: $F_1 \geq L_1$ and $F_2 \leq L_2$ and $F_k \leq L_k$ evaluating $((R-V) \text{ AND } M) = (V \text{ XOR } R) \text{ AND } M)$, wherein said AND operator represents bit-wise AND of two bit vectors and said XOR operator represents bit-wise Exclusive OR of two bit vectors; and (e) outputting results of said evaluation operation in (d).

2. The computer-based method of claim 1, wherein, said method in step (d), instead of evaluating if $((V-R) \text{ AND } M) = (V \text{ XOR } R) \text{ AND } M)$, evaluates if $(((V-R) \text{ XOR } V \text{ XOR } R) \text{ AND } M) = 0$.

3. The computer-based method of claim 1, wherein, said method in step (d), instead of evaluating if $((V-R) \text{ AND } M) = (V \text{ XOR } R) \text{ AND } M)$, evaluates if $((V-R) \text{ XOR } V \text{ XOR } R) \text{ OR } (\text{NOT } M) = (\text{NOT } M)$.

4. The computer-based method of claim 1, wherein said wherein C is equal to 1.

5. The computer-based method of claim 1, wherein said evaluations are computed exclusively via processor instructions.

6. A computer based method to simultaneously evaluate conjunctions of one or more range or equality predicates on k fields $F_1, F_2, \ldots F_k$ of a record, said method implemented in computer readable program code stored in computer storage, said method comprising the steps of:
(a) computing $B_i = S_i - C$ for said k fields, wherein C is a constant whole number and where each predicate is one of four forms: (i) $L_i \leq F_i$ or (ii) $F_i \leq U_i$ or (iii) $F_i = L_i$ or (iv) $L_i \leq F_i \leq U_i$, said $L_1, L_2 \ldots L_k$ representing values, and said k fields being at offsets $[S_1, E_1], [S_2, E_2] \ldots [S_k, E_k]$ of said record, wherein offset [X, Y] represents bits X through Y;

(b) constructing a mask to extract values of k bits $B_1, B_2, \ldots, B_k$, said mask comprising a bit vector M having 1s in bits at k bit positions, $B_1, B_2, \ldots, B_k$ having 0s in remainder of bits;

(c) constructing a first value vector containing lower bound values, said first value vector comprising a bit vector $V_L$ having 0s everywhere except one or more of the following: $L_1$ at bit positions $[S_1, E_1]$, $L_2$ at bit positions $[S_2, E_2] \ldots L_k$ at bit positions $[S_k, E_k]$;

(d) constructing a second value vector containing upper bound values, said second value vector comprising a bit vector $V_U$ having 1s everywhere except one or more of the following: $U_1$ at bit positions $[S_1, E_1]$, $U_2$ at bit positions $[S_2, E_2] \ldots U_k$ at bit positions $[S_k, E_k]$;

(e) for each record, R, on which said predicates need to be applied, evaluating as part of constant-time query processing:

$(((V_U-R) \text{ XOR } (R-V_L)) \text{ AND } M) = (V_U \text{ XOR } V_L) \text{ AND } M$, wherein said AND operator represents bit-wise AND of two bit vectors and said XOR operator represents bit-wise Exclusive OR of two bit vectors; and (f) outputting results of said evaluation operation in (e).

7. The computer-based method of claim 6, wherein, said method in step (e), instead of evaluating if $(((V_U-R) \text{ XOR } (R-V_L)) \text{ AND } M) = (V_U \text{ XOR } V_L) \text{ AND } M)$, evaluates if $((V_U-R) \text{ XOR } (R-V_L) \text{ XOR } V_U \text{ XOR } V_L) \text{ AND } M = 0$.

8. The computer-based method of claim 6, wherein, said method in step (e), instead of evaluating if $(((V_U-R) \text{ XOR } (R-V_L)) \text{ AND } M) = (V_U \text{ XOR } V_L) \text{ AND } M)$, evaluates if $((V_U-R) \text{ XOR } (R-V_L) \text{ XOR } V_U \text{ XOR } V_L) \text{ OR } (\text{NOT } M) = (\text{NOT } M)$.

9. The computer-based method of claim 6, wherein said wherein C is equal to 1.

10. The computer-based method of claim 6, wherein said evaluations are computed exclusively via processor instructions.

11. The computer-based method of claim 6, wherein said method further comprises the step of precomputing $(V_U \text{ XOR } V_L) \text{ AND } M$, and evaluating remainder of expression in (e) on a per record basis.

12. A computer based method to simultaneously evaluate conjunctions of a mixture of in-list predicates on k fields, said method implemented in computer readable program code stored in computer storage, said method comprising the steps of:

(a) constructing a first mask to extract values of said k fields, said mask comprising a bit vector M having 1s in bits $[S_1, E_1], [S_2, E_2] \ldots [S_k, E_k]$ and having 0s in remainder of bits, wherein said k fields comprise $F_2, \ldots F_k$ of the form $F_1$ in $(L_{11}, L_{12} \ldots L_{1n})$ and $F_2$ in $(L_{21}, L_{22} \ldots L_{2n})$ and $\ldots F_k$ in $(L_{k1}, L_{k2} \ldots L_{kn})$, said k fields being at offsets $[S_1, E_1], [S_2, E_2] \ldots [S_k, E_k]$;

(b) constructing a second mask to extract most significant bit of each field, said second mask comprising a bit vector S having 0s in bits $S_1, S_2, \ldots, S_k$ and having 1s in remainder of bits;

(c) for each 1 through n, computing a bit vector of values $V_1, V_2, \ldots, V_n$, wherein $V_i$ has 0s in all bits except values $L_{1i}, L_{2i}, \ldots L_{ki}$ at $[S_1, E_1], [S_2, E_2] \ldots [S_k, E_k]$, respectively;

(d) for each record, R, on which said predicates need to be applied, evaluating as part of constant-time query processing n numbers as follows:

$N_1 = ((((V_1 \text{ XOR } R) \text{ AND } S) + S) \text{ OR } (V_1 \text{ XOR } R))$;
$N_2 = ((((V_2 \text{ XOR } R) \text{ AND } S) + S) \text{ OR } (V_2 \text{ XOR } R))$;
$N_n = ((((V_n \text{ XOR } R) \text{ AND } S) + S) \text{ OR } (V_n \text{ XOR } R))$;

and then evaluating the following condition:

$((N_1 \text{ AND } N_2 \text{ AND } \ldots N_n) \text{ OR } S) = S$ wherein said AND operator represents bit-wise AND of two bit vectors, said XOR operator represents bit-wise Exclusive OR of two bit vectors, + represents addition, and OR represents bit-wise OR; and (e) outputting results of said evaluation operation in (d).

13. The computer-based method of claim 12, wherein said evaluations in step (d) are computed exclusively via processor instructions.

* * * * *